United States Patent [19]

Yano et al.

[11] Patent Number: 4,838,105
[45] Date of Patent: Jun. 13, 1989

[54] REVERSING GEAR ASSEMBLY FOR YACHTS

[75] Inventors: Kazuhiko Yano, Toyonaka; Kazuhiko Ohtsuki, Takarazuka; Gen Yoshii, Mukonoso-Honmachi, all of Japan

[73] Assignee: Kanzaki Kokyukoki Mfg. Co., Ltd., Amagasaki, Japan

[21] Appl. No.: 63,822

[22] Filed: Jun. 19, 1987

[30] Foreign Application Priority Data

Aug. 11, 1986 [JP] Japan .................. 61-188014

[51] Int. Cl.$^4$ .............................................. F16H 3/14
[52] U.S. Cl. ......................................... 74/377; 74/378; 74/416
[58] Field of Search ................ 74/376, 377, 378, 379, 74/416, 361

[56] References Cited

U.S. PATENT DOCUMENTS

| | | | |
|---|---|---|---|
| 1,707,247 | 7/1925 | Berge | 74/416 |
| 2,423,886 | 7/1947 | Hindmarch | 74/378 |
| 2,924,985 | 2/1960 | Crankshaw | 74/378 |
| 3,570,319 | 3/1971 | Arnold | 74/361 |
| 3,803,934 | 4/1974 | Yokel | 74/361 |
| 4,188,833 | 2/1980 | Krauss et al. | 74/417 |
| 4,278,156 | 7/1981 | Yano | 74/470 X |
| 4,643,687 | 2/1987 | Yano et al. | 74/416 |
| 4,679,673 | 7/1987 | Yamaoka et al. | 74/377 X |
| 4,688,447 | 8/1987 | Dick | 74/665 T |
| 4,748,864 | 6/1988 | Ohtsuki et al. | 74/377 |

FOREIGN PATENT DOCUMENTS 237248 11/1985 Japan ................................. 74/377
2169571 1/1986 United Kingdom .

Primary Examiner—Dwight G. Diehl

[57] ABSTRACT

A reversing gear assembly (13) for use in yachts having an angle drive system comprises a horizontal input shaft (15), to be connected to a horizontally mounted engine (11), and an inclined output shaft (16) to be connected to the propeller shaft (12). Gear casing (14) includes an intermediate shaft (17) which extends parallel with the output shaft (16). The forward direction drive path includes meshing cylindrical gear (18) and conical gear (20) on the input and output shafts (15, 16). The reverse direction drive path has on the input and output shafts (15, 16) two cylindrical gears (19, 21) with which a skew cylindrical gear (22) on the intermediate shaft (17) meshes at respective axial halves of the skew gear. The center of engagement between the meshing gears (19, 22) on the input and intermediate shafts (15, 17) is located on the sole, common perpendicular line of these shafts. A reversing clutch (23) is disposed on the output shaft (16).

The minimum number of shafts and gears for attaining the forward and reverse direction drives and a speed reduction in a reversing gear assembly is three shafts and five gears. Using only one conical gear in such an assembly reduces the troublesome backlash-adjusting work associated with conical gears.

3 Claims, 3 Drawing Sheets

REVERSING GEAR ASSEMBLY FOR YACHTS

FIELD OF THE INVENTION

This invention relates to a reversing gear assembly for use in yachts.

More particularly, the present invention relates to a reversing gear assembly for use in yachts and adapted to be incorporated between an engine, mounted at a stern portion of the hull of a yacht so that its output end is directed towards the stern, and a propeller shaft arranged to extend backwardly and downwardly from the hull. Thus, the present invention relates to a reversing gear assembly for use in marine angle drive system.

DESCRIPTION OF PRIOR ART

A standard type of such angle drive system is constructed in such a manner that the whole of the propulsion unit from engine to propeller shaft through the reversing gear assembly is mounted in an attitude which is inclined backwardly and downwardly by an angle equal to the inclination angle to be given to the propeller shaft. In a yacht having an angle drive system of this standard type, height of the engine compartment must be enlarged due to the inclined attitude of the engine so that the adjacent crew space is reduced correspondingly. Enlargement of crew space within the hull of a yacht is very important and is always required. From this, there have been proposed some propulsion units of angle drive type in which, while the engine is mounted in a horizontal or nearly horizontal posture, the transmission path is bent at a portion, where the reversing gear assembly is located, so as to give the required backward and downward inclination to the transmission path.

U.S. Pat. Nos. 3,570,319 and 4,188,833 disclose a prior art device in which conical gears are used for providing an inclination in the marine propulsion transmission path within a reversing gear casing. This prior art marine propulsion unit is economical, because a conical gear may be manufactured at a relatively low cost by using a hobbing machine with the aid of a taper attachment for varying the distance between a hob and the center of a gear blank when the hob is moved across the gear blank so as to form the toothed profile. Such propulsion unit may be made a compact one, because it has a structure such that some of the gears employed in a reversing gear assembly for the standard type propulsion unit are replaced by conical gears or intermeshing conical and cylindrical gears without increasing the number of gears.

In the reversing gear assembly disclosed in each of the two U.S. patents set forth above, an intermediate shaft is arranged within a gear casing at a mid level between an input shaft arranged at a high level and an output shaft arranged at a low level. Forward drive is transmitted from the input shaft directly to the output shaft by a selective operation of a forward pressure fluid operated clutch of the multi-disc type on the input shaft, whereas reverse drive is transmitted from the input shaft via the intermediate shaft to the output shaft by a selective operation of a fluid pressure operated reverse clutch of the multi-disc type on the intermediate shaft. For attaining a transmission of power between two shafts which are inclined relative to each other, either a pair of intermeshing conical gears or intermeshing conical and cylindrical gears are used. For driving the output shaft and, therefore, a propeller shaft connected thereto in either direction with equal power, gear ratios of the forward direction gear train and reverse direction gear train arranged between the input shaft and output shaft are made equal to each other.

When gear ratios of forward direction gear train and reverse direction gear train are to be made equal to each other, as described above, a certain limit is given to the relative distances between each two shafts of the input, intermediate and output shafts. From this limit, the gear assembly disclosed in each of the U. S. patents set forth before employs two conical gears. Use of two conical gears is not preferred because a conical gear is still high in manufacturing cost in comparison with a cylindrical gear. A more serious problem resides in a fact that a conical gear requires a precise adjustment of backlash. Breaking of gear tooth edges will be caused when such backlash is too large, whereas a noise of a high frequency will be generated when the backlash is too small. Such backlash can be adjusted only by displacing a conical gear along its axis. This work is considerably difficult and, thus, it is preferred for saving manufacturing cost to reduce the number of conical gears to be used.

An art which solves this problem is disclosed in published UK Patent Application GB No. 2,169,571A. In the reversing gear assembly according to this art, a horizontal input shaft and a backwardly and downwardly inclined output shaft are arranged at a low level within gear casing so that these two shafts are spaced slightly in the fore and aft direction of the casing. In the gear casing are further journalled a horizontal clutch shaft, located at a high level, and a horizontal intermediate shaft located at a mid level. The clutch shaft has thereon axially spaced rotatable forward and reverse drive gears The forward drive gear is driven to rotate by a direct meshing with an input gear on the input shaft, whereas the reverse drive gear is driven to rotate through a first intermediate gear, mounted on the intermediate shaft and meshing with the input gear set forth above, and a second intermediate gear mounted on the intermediate shaft and meshing with the reverse drive gear. On the clutch shaft and between the forward and reverse drive gears is disposed a clutch means which couples one of these drive gears selectively to the clutch shaft. For transmitting rotation from the horizontal clutch shaft, selectively rotated in the forward or reverse drive direction, to the inclined output shaft to which a coaxially disposed propeller shaft is coupled, a cylindrical gear which is fixedly mounted on an aft end portion of the clutch shaft meshes with a conical gear which is fixedly mounted on the output shaft.

It is thus seen that only one conical gear is employed which is used for connecting operatively between the horizontal clutch shaft and inclined output shaft. Consequently, the reversing gear assembly disclosed in the GB No. 2,169,571A requires a precise adjustment of backlash with respect to only one conical gear.

On the other hand, this gear assembly employs a relatively large number of transmission shafts and gears in the gear casing.

OBJECT

Accordingly, a primary object of the present invention is to provide a novel reversing gear assembly for yachts in which number of shafts and gears employed is reduced to the maximum extent while only one conical gear is used.

SUMMARY OF THE INVENTION

Figure 5:
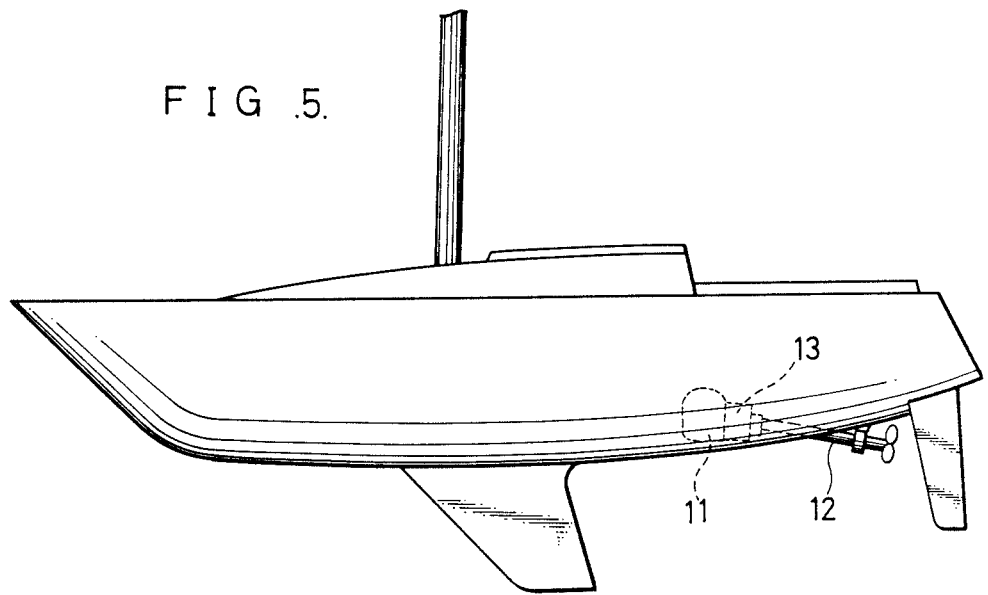
FIG. 5 is a schematic side view of a yacht in which the reversing gear assembly shown in FIG. 1 is employed.

The present invention relates to a reversing gear assembly 13 for use in yachts, as shown in FIG. 5, between an engine 11, mounted in a stern portion of the hull of a yacht with the output end of the engine towards the stern, and a propeller shaft 12 extending backwardly and downwardly from the hull.

As shown in FIGS. 1 to 4, the reversing gear assembly 13 according to the present invention comprises a gear casing 14 in which are arranged a horizontal input shaft 15 extending forwardly from the casing 14, an inclined output shaft 16 extending backwardly and downwardly from the casing 14, and an intermediate shaft 17 disposed in parallel with the output shaft 16.

The gear assembly further comprises axially spaced first cylindrical gear 18 and second cylindrical gear 19 which are fixedly mounted on the input shaft 15, axially spaced conical gear 20 and third cylindrical gear 21 which are rotatably mounted on the output shaft 16, and a skew cylindrical gear 22 mounted on the intermediate shaft 17. The conical gear 20 on the output shaft 16 meshes with the first cylindrical gear 18 on the input shaft 15 so as to provide the forward drive gear train. The third cylindrical gear 21 on the output shaft 16 is offset in position slightly from the second cylindrical gear 19 on the input shaft 15 in the fore and aft direction so as to provide an axially apart relationship between these cylindrical gears 19 and 21. And, the skew cylindrical gear 22 on the intermediate shaft 17 meshes with both of such second and third cylindrical gears 19 and 22. Center of engagement or contact between the second cylindrical gear 19 and skew cylindrical gear 22 is located substantially on a common perpendicular line of the input and intermediate shafts 15 and 17.

Figure 1:
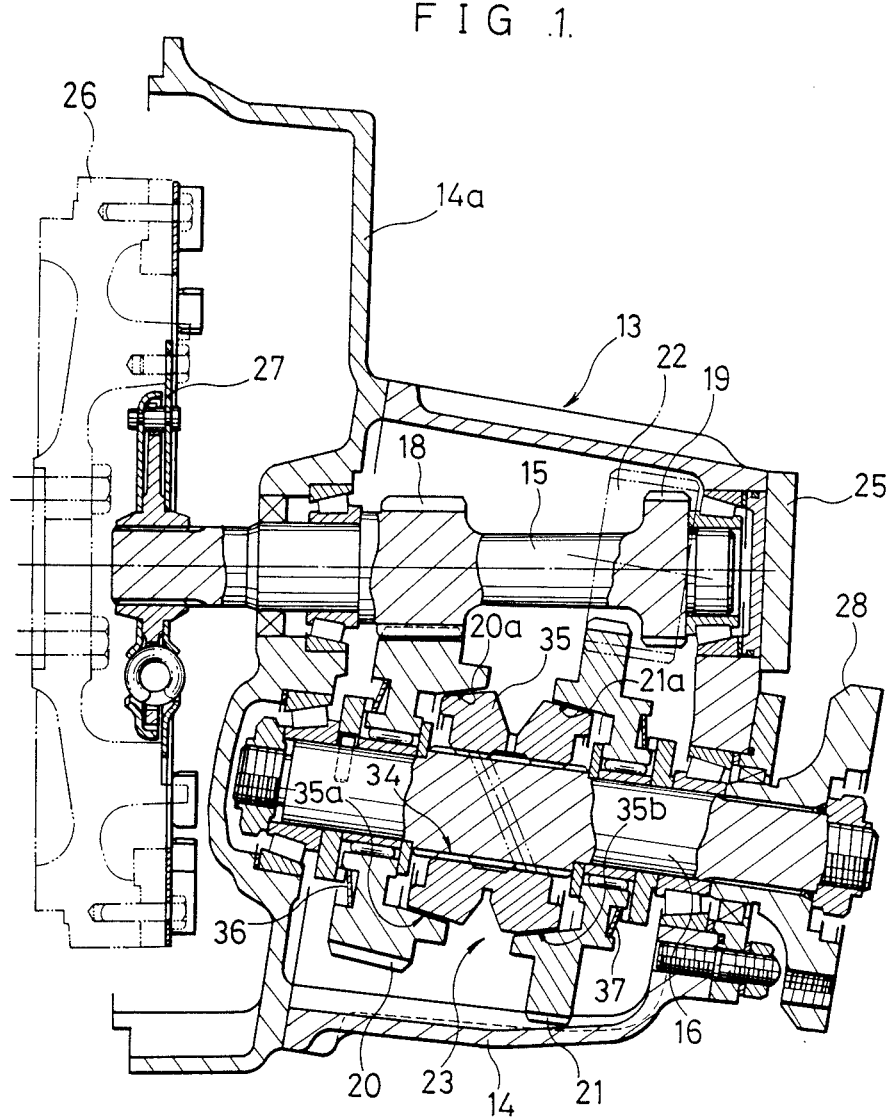
FIG. 1 is a sectional side view of an embodiment of the reversing gear assembly according to the present invention.

The gear assembly 13 further includes a clutch means 23 which is disposed on the output shaft 16 and between the conical gear 20 and third cylindrical gear 21 for coupling one of these gears selectively to the output shaft 16, as shown in FIG. 1.

Because the second cylindrical gear 19 on the input shaft 15 and the third cylindrical gear 21 on the output shaft 16 are in an offset relationship with each other in the fore and aft direction, the skew cylindrical gear 22, which is mounted on the intermediate shaft 17 so as to mesh with both of the second and third cylindrical gears 19 and 21, has a relatively large axial length and meshes at its respective axial halves with the second and third gears 19 and 21.

Figure 4:
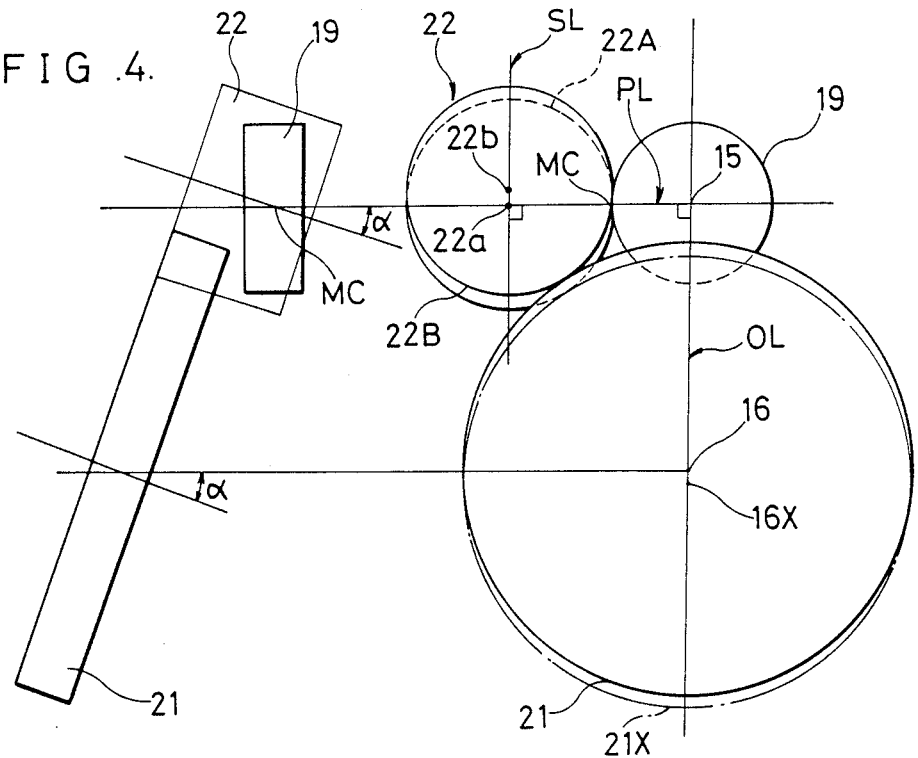
FIG. 4 is a schematic view for explaining meshing of gears in the reversing gear assembly shown in FIG. 1.

Meshing between the second cylindrical gear 19 and skew cylindrical gear 22 and meshing between the skew cylindrical gear 22 and third cylindrical gear 21 are schematically illustrated in FIG. 4. With respect to the skew cylindrical gear 22, pitch circle of the aft half 22A (having its center at 22a) and pitch circle of the fore half 22B (having its center at 22b) are illustrated in the right side of FIG. 4. Center of the second cylindrical gear 19 is designated by numeral "15" for representing the input shaft, whereas center of the third cylindrical gear 21 is designated by numeral "16" for representing the output shaft. Supposed that the third cylindrical gear 21 were displaced along the output shaft 16 to a position corresponding to the axial position of the second cylindrical gear 19, such displaced third cylindrical gear 21X (having its center at 16X) is depicted in FIG. 4 in phantom.

With respect to the horizontal input shaft 15 and inclined intermediate shaft 17, there exists a sole line PL which is commonly perpendicular to these shafts. Center of engagement MC between the second cylindrical gear 19 and skew cylindrical gear 22 on such two shafts is particularly located on the sole, common perpendicular line PL, as shown in FIG. 4.

Exactly speaking, the center of pitch circle 22b shown in the right side of FIG. 4 with respect to the fore half of the skew cylindrical gear 22 is located on a plane which includes the center of pitch circle 22a with respect to the aft half of the gear 22 and is perpendicular to the common perpendicular line PL (namely a vertical plane, with respect to FIG. 4, including the straight line SL shown). Because the intermediate shaft 17 extends parallel with the output shaft 16, center of the third cylindrical gear 21 designated in FIG. 4 by numeral "16" for representing the output shaft is, in practice, located on a vertical plane, with respect to FIG. 4, including a straight line OL shown. The straight line OL is such that includes the imaginary center 16X of the third cylindrical gear referred to before and center of the second cylindrical gear 19 (designated in FIG. 4 by numeral 15) and is perpendicular to the common perpendicular line PL.

The reversing gear assembly according to the present invention can be used in a yacht having angle drive system by coupling the input shaft 15 or the fore end thereof to engine and by coupling the output shaft 16 or the aft end thereof to a propeller shaft, as shown in FIG. 5.

Forward drive of the yacht is attained by coupling the conical gear 23 to the output shaft 16 using clutch 23. Power of the engine is transmitted from the input shaft 15 to the propeller shaft via the first cylindrical gear 18, conical gear 20, and output shaft 16. Reverse drive is attained by coupling the third cylindrical gear 21 to the output shaft 16 using clutch 23. In this case, power of the engine is transmitted from the input shaft 15 to the propeller shaft via the second cylindrical gear 21, skew cylindrical gear 22, third cylindrical gear 21, and output shaft 16.

In the forward direction drive of yacht, torque is transmitted between the first cylindrical gear 18 on the input shaft 15 and the conical gear 20 on the output shaft 16 in a condition that teeth of these gears 18 and 20 are deformed due to stress acting therebetween so that contact or engagement is caused which will spread the load all over the axial length of such gears 18 and 20. From the point of view of the efficiency of torque transmission, it is, of course, the best way to replace the first cylindrical gear 18 by a conical gear so as to connect between the input and output shafts by two meshing conical gears. In yachts, however, propulsion mechanism by engine rather belongs to an auxiliary machinery which is used only at limited times, such as at the entry to and departure from a harbor. Accordingly, the forward drive gear train comprising the meshing cylindrical gear 18 and conical gear 20 is satisfactory.

In the reverse direction drive of yacht, torque is transmitted between the second cylindrical gear 19 on the input shaft 15 and the skew cylindrical gear 22 on the intermediate shaft 17 in a condition that teeth of these gears are deformed due to stress acting therebetween so that contact or engagement is caused which will spread the load over some axial length of such gears 19 and 22. Although such transmission of torque is, of course, unfavorable with respect to efficiency of torque transmission and in view of a possible damage of transmission members due to a torsional deformation, the reverse direction drive of a yacht is carried out almost only for yacht-stopping purpose after the entry to a habor using the reverse direction drive for braking the yacht. Consequently, the reverse drive gear train including the skew cylindrical gear 22 does not cause any problem is practice.

In view of the limited uses of a propulsion mechanism by engine in a yacht, the present invention employs, in the forward direction drive path, the meshing cylindrical and conical gears 18 and 22 between the horizontal input shaft 15 and inclined output shaft 16 and particularly, in the reverse direction drive path which is used almost only for braking the yacht, a transmission mechanism using the skew cylindrical gear 22 between the horizontal input shaft 15 and inclined intermediate shaft 17. The reversing gear assembly according to the present invention thus includes three shafts, namely input, output and intermediate shafts 15, 16 and 17, and five gears, namely two gears 18, 19 on the input shaft 15, two gears 20, 21 on the output shaft 16 and one gear 22 on the intermediate shaft 17, of which only one (20) is conical gear. Three of the shafts and five of the gears are the minimum for attaining the forward and reverse direction drives and a speed reduction in a marine reversing gear assembly. The reversing gear assembly according to the present invention is thus such in that number of shafts and gears is reduced to the maximum extent while only one conical gear is used. Consequently, manufacturing cost is much saved.

In the structure having a horizontal input shaft 15 and inclined and in-parallel extending output and intermediate shafts 16, 17, it is theoretically possible to dispose the second and third cylindrical gears 19 and 21 on the input and output shafts 15 and 16 at a same position in the fore and aft direction so that the skew cylindrical gear 22 on the intermediate shaft 17 meshes with the second and third cylindrical gears 19 and 21 at a same position in the fore and aft direction. In this case, the axial length of the skew cylindrical gear 22 may be reduced. In such case, however, an extremely large-sized gear is required as the third cylindrical gear 21 on the output shaft 16 so that the reversing gear assembly will be enlarged in size and manufacturing cost will rather be increased. In view of this, the present invention gives an offset relationship in the fore and aft direction to the arrangement of the second and third cylindrical gears 19 and 21 so as to mesh the skew cylindrical gear 22 at its respective axial halves with the second and third cylindrical gears 19 and 21. Consequently, disadvantage referred to above will not arise.

Even when gear ratio or transmission ratio of the forward drive gear train is changed from that of the standard type gear assembly according to a customer's demand, the skew cylindrical gear 22 in the reverse drive gear train may be unchanged. This is because the resulting change in gear ratio of the reverse drive gear train will cause no problem due to the fact that the reverse drive is used not for the positive yacht-propelling purpose but for the yacht-braking purpose. Use of the skew cylindrical gear in the reverse drive gear train is advantageous also in this respect.

DESCRIPTION OF A PREFERRED EMBODIMENT

The reversing gear assembly 13 shown, intended for use in a yacht shown in FIG. 6 referred to before, comprises a gear casing 14 to be attached to the rear end of an engine, as shown in FIG. 1. The casing 14 shown has a fore end cover 14a which is also used as a mounting means for mounting the gear assembly on the rear of the engine.

Figure 2:
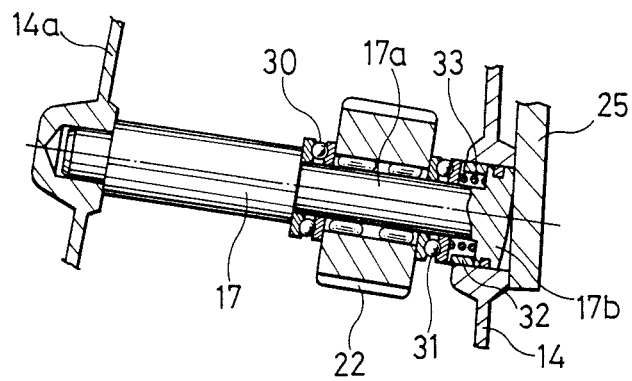
FIG. 2 is a sectional side view of a part of the reversing gear assembly shown in FIG. 1, illustrating a section different from that shown in FIG. 1.
Figure 3:
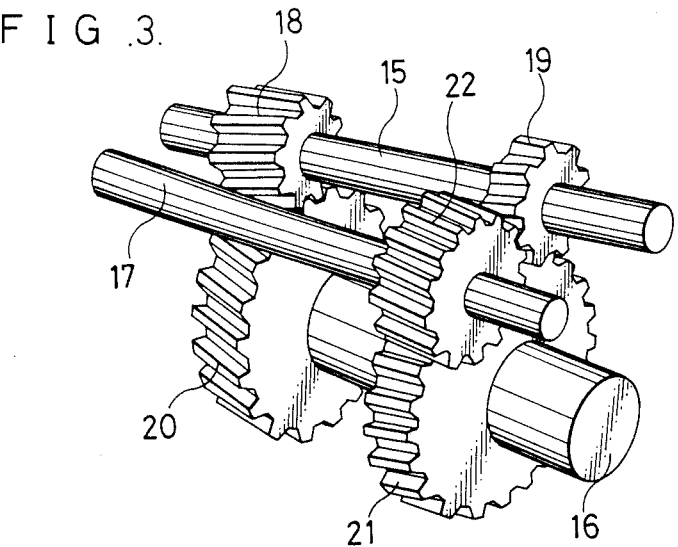
FIG. 3 is a schematic perspective view, showing the arrangement of shafts and gears in the reversing gear assembly shown in FIG. 1.

As shown in FIG. 1 to 3, the gear casing 14 supports therein an input shaft 15, an output shaft 16 and an intermediate shaft 17. Of these three shafts, the input shaft 15 and the output shaft 16 are journalled by the fore end cover 14a and the rear wall of casing 14 through bearings. The intermediate shaft 17 is fitted at both ends thereof into bores in the fore end cover 14a and the rear wall of casing 14 and is prevented from getting-out by a plate 25 attached to the rear surface of casing 14, as shown in FIG. 2. The input shaft 15 is arranged to extend horizontally, whereas the output shaft 16 is inclined backwardly and downwardly by an angle equal to the inclination angle of the propeller shaft 12 shown in FIG. 5. The intermediate shaft 17 is inclined by an angle (angle α shown in FIG. 4) equal to the inclination angle of the output shaft 16 so that the intermediate shaft extends parallel with the output shaft.

As shown in FIG. 1, the input shaft 15 extends forwardly from the gear casing 14 and is connected to the flywheel 26 of the engine through a damper coupling 27. The output shaft 16 extends backwardly from the casing 14 and has at its aft end portion a coupling half 28 for connection to the propeller shaft 12.

The input shaft 15 is formed at its fore and aft end portions within the casing 14 integrally with a small first cylindrical gear 18 and second cylindrical gear 19. On the output shaft 16 are rotatably mounted a large conical gear 20 and large cylindrical gear 21 which are spaced from each other in the fore and aft direction. The conical gear 20 on the backwardly and downwardly inclined output shaft 16 has teeth on a conical surface, converging to a point on the forward extension of the axis of output shaft 16, and meshes with the first cylindrical gear 18 on the horizontal input shaft 15. The third cylindrical gear 21 on the output shaft 16 is located slightly forwards of the second cylindrical gear 19 on the input shaft 15.

As clearly shown in FIG. 2, a rear half of the intermediate shaft 17 is formed to a diameter-reduced portion 17a on which a skew cylindrical gear 22 having a relatively large axial length is rotatably mounted through bearing means. This skew cylindrical gear 22 meshes at its aft half with the second cylindrical gear 19 on the input shaft 15 and at the fore half with the third cylindrical gear 21 on the output shaft 16.

Rotation of the meshing gears 19 and 22 on the shafts 15 and 17 which are inclined relative to each other will produce an axial thrust. A pair of thrust bearings 30 and 31 which sandwiches the skew cylindrical gear 22 are thus provided on the diameter-reduced portion 17a of the intermediate shaft 17, as shown in FIG. 2. On the shaft 17 is further disposed a ring 32 which is slightly spaced from the rewardly located bearing 31 and abuts on a diameter-enlarged end portion 17b of the intermediate shaft. Within this ring 32 and on the shaft 17 is disposed a compression coil spring 33 which is received at the ends thereof by the bearing 31 and shaft end portion 17b.

As shown in FIG. 1, a clutch 23 is provided between the conical gear 20 and cylindrical gear 21 on the output shaft 16. This clutch 23 comprises a sliding double cone 35 which is slidably but non-rotatably mounted on the output shaft 16 by a helical spline connection 34. This cone 35 is formed with a pair of conical clutch surfaces 35a and 35b for selective engagement frictionally with respective conical clutch surfaces 20a and 21a formed in the conical and cylindrical gears 20 and 21. For avoiding an excessive torque transmission in each of the engaged conditions of the clutch 23, each of the gears 20 and 21 on the output shaft 16 is slidably supported, so that it may move slightly from the position shown in FIG. 1 towards a direction away from the cone 35, and is biased to the position shown by Belleville spring means 36, 37.

The cone 35 on the output shaft 16 is shifted by a remote control mechanism such as that, for example, disclosed in U.S. Pat. No. 4,278,156 selectively into a forward direction position, where the cone 35 is displaced forwards to cause frictional engagement between the clutch surfaces 20a and 35a, or into a reverse direction engagement between the clutch surfaces 21a and 35b.

The reversing gear assembly 13 shown is to be employed in a yacht in the fashion shown in FIG. 5. Forward direction drive and reverse direction drive of the yacht are attained, respectively, by shifting the cone 35 on the output shaft 16 so as to couple selectively the conical gear 20 and the cylindrical gear 21 to the output shaft 16. In either drive, rotation of the input shaft 15 is transmitted to the output shaft 16 and propeller shaft 12 with a reduction of rotation speed between gears 18 and 20 or between gears 22 and 21.

The skew cylindrical gear 22 on the intermediate shaft 17 is supported so that it is slightly movable under the biasing of compression spring 33. This supporting structure contributes to protect the gear 22 from a possible damage due to a torsional deformation during a reverse direction drive of the yacht.

We claim:

1. A reversing gear assembly for use in yachts between an engine, mounted in a stern portion of the hull of a yacht with the output end of the engine directed towards the stern, and a propeller shaft extending backwardly and downwardly from the hull, the reversing gear assembly comprising:

a gear casing (14) in which are arranged a horizontal input shaft (15) extending forwardly from said casing, an inclined output shaft (16) extending backwardly and downwardly from said casing, and an intermediate shaft (17) disposed in parallel with said output shaft;

axially spaced first cylindrical gear (18) and second cylindrical gear (19) which are fixedly mounted on said input shaft (15), axially spaced conical gear (20) and third cylindrical gear (21) which are rotatably mounted on said output shaft (16), said conical gear meshing with said first cylindrical gear and said third cylindrical gear being offset in position slightly from said second cylindrical gear in the fore and aft direction, a skew cylindrical gear (22) mounted on said intermediate shaft (17) and meshing with both of said second and third cylindrical gears, center of engagement between said second cylindrical gear and said skew cylindrical gear being located substantially on a common perpendicular line of said input and intermediate shafts; and a clutch means (23) disposed on said output shaft (16) and between said conical gear (20) and said third cylindrical gear (21) for coupling one of the said gears selectively to said output shaft.

2. A reversing gear assembly according to claim 1, wherein a pair of thrust bearing means (30, 31) are provided for receiving axial thrust acting upon said skew cylindrical gear (22).

3. A reversing gear assembly according to claim 2, wherein said skew cylindrical gear (22) is rotatably mounted on said intermediate shaft (17), said thrust bearing means (30, 31) being disposed on said intermediate shaft so as to sandwich said skew cylindrical gear.

* * * * *